United States Patent [19]

Fishman et al.

[11] 4,374,351
[45] Feb. 15, 1983

[54] DIGITAL DRIVE UNIT REGULATOR

[75] Inventors: Walter Fishman, Hatfield; Theron W. Jenkins, Jr., Ambler, both of Pa.

[73] Assignee: Leeds & Northrup Company, North Wales, Pa.

[21] Appl. No.: 214,617

[22] Filed: Dec. 9, 1980

[30] Foreign Application Priority Data

Jan. 9, 1980 [GB] United Kingdom ................. 8000626

[51] Int. Cl.³ ............................................ G05B 19/26
[52] U.S. Cl. ..................................... 318/600; 318/603
[58] Field of Search ............... 318/600, 601, 602, 603; 364/474

[56] References Cited

U.S. PATENT DOCUMENTS

| | | | |
|---|---|---|---|
| 3,523,229 | 8/1970 | Black et al. | 318/601 |
| 3,742,326 | 6/1973 | Masahiko | 318/601 X |
| 3,752,969 | 8/1973 | Kiffmeyer et al. | 318/601 |
| 3,795,851 | 3/1974 | Gage et al. | 318/603 |
| 3,904,858 | 9/1975 | Rosshirt | 318/603 X |
| 4,023,085 | 5/1977 | Bishop et al. | 318/603 X |
| 4,294,531 | 10/1981 | Shenk | 318/601 |
| 4,296,364 | 10/1981 | Fukuyama | 318/603 X |

OTHER PUBLICATIONS

Millman et al., *Integrated Electronics: Analog and Digital Systems*, 1972, pp. 665-666.

Primary Examiner—B. Dobeck
Attorney, Agent, or Firm—William G. Miller, Jr.; Raymond F. MacKay

[57] ABSTRACT

A means to change the position of a drive unit in accordance with desired changes periodically provided as a digital value and entered in a first register, which is then decremented to zero by counting actual increments of drive unit change. Power to change the drive unit is proportional to the residual value in this register, with no power when actual change has equalled desired change. The count of actual change increments is determined from clock pulses updating a second register representing position whenever the analog equivalent of this register differs from an analog signal representing actual position.

6 Claims, 1 Drawing Figure

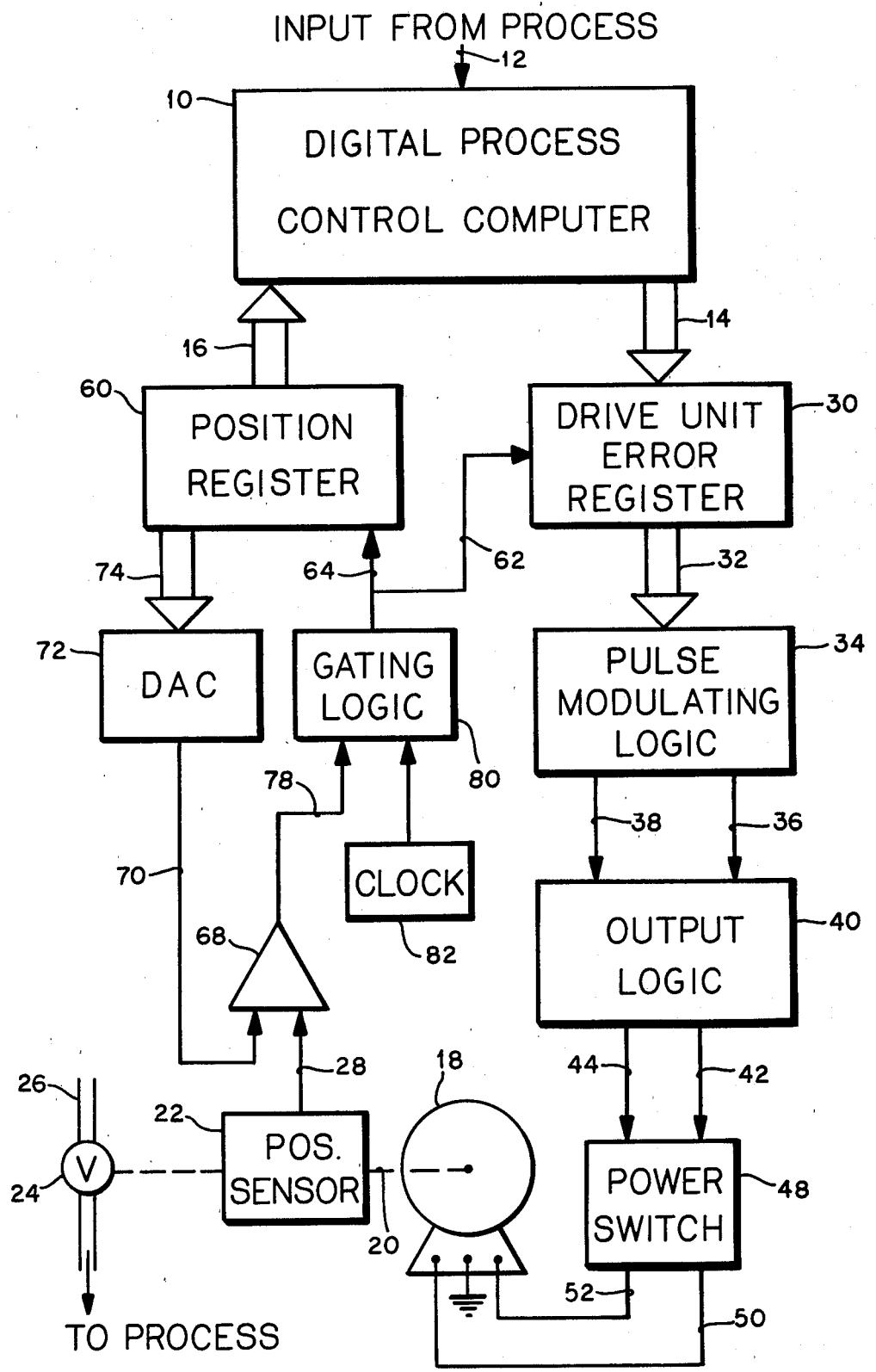

DIGITAL DRIVE UNIT REGULATOR

BACKGROUND OF THE INVENTION

This invention relates to means for controlling the position of an electric drive unit of a control system in response to digital signals indicative of the required change in drive unit position. More specifically, this invention relates to the use of digital signals for regulation of position changes of large drive units which due to high inertia have a non-linear relationship between drive unit travel and time duration of energizing power.

In certain prior art to position the drive unit in response to digital signals, it has usually been necessary to utilize the computer as a means of comparing the actual position of the drive unit with the desired position. That approach is often found undesirable because of the periodic nature of the feedback of a rapidly changing position. In other prior art the drive units have frequently been positioned solely in response to the time duration of the signals sent to the drive units, thus resulting in a non-linear response by failing to take into account the non-linear speed of the drive due to the inertia of the drive unit itself and by a variable load on the drive unit.

It is an object of this invention to provide a means for making precise changes in drive unit positions in a digital control system so as to overcome the disadvantages of the variable relationship between the time duration of energizing the drive unit and its actual change in position.

SUMMARY OF THE INVENTION

To accomplish the object of this invention, there is provided apparatus for controlling the position of an electric drive unit in response to periodically produced digital control signals which are indicative of the position change required for the drive unit during the period. The apparatus includes a first register which receives the digital control signal indicative of the position change required and changes the magnitude of its stored value accordingly. Means are provided for supplying power to the drive unit in an amount proportional to the stored value in the first register so as to move the drive unit in a direction and by an amount corresponding respectively to the sign and magnitude of that stored value. Means are also provided for producing an analog signal representing the actual position of the drive unit. A second register is provided for storing a signal indicative of the position of the drive unit. The contents of the second register is utilized through a digital to analog converter to produce an analog signal representing the position of the drive unit. The analog signal from the digital to analog converter is compared with the actual position signal and the output of the comparator operates a gate means which is operable to gate clock signals from a clock source to step the first and second registers until the analog signal from the converter corresponds with the actual position signal, thus up-dating the first and second registers so that the contents of the first register represents the change in position which has not yet been effected by the drive unit and the contents of the second register represents the existing position of the drive unit. Until the contents of the first register are brought to zero, power is modulated to the drive unit. Thus the actual change in drive unit position is made in accordance with the digital control signal received.

BRIEF DESCRIPTION OF THE DRAWING

The FIGURE shows a block diagram of the digital drive unit regulator of this invention in its preferred form.

DESCRIPTION OF THE PREFERRED EMBODIMENT

In the drawing there is shown a digital control computer 10 which receives on line 12 an input from the process being controlled and produces on the bus or line 14 digital signals indicative of the change in position required for the drive unit during the period between consecutive calculations of that change value. The computer 10 may utilize as one input digital signals from the lines 16 representing the existing position of the drive unit, namely drive unit 18 which may be used in the data base. However, the signals on line 16 are not required for establishing drive unit position.

In the Figure the drive unit 18 is shown as an electric drive unit which is effective by way of the mechanical coupling 20 to change the position of the position sensor 22 as well as the position of the valve 24. The valve 24 may, for example, be effective in controlling the flow of a process fluid in the pipe 26 so as to modify the input to the process which affects the variable being measured and controlled. That variable is transmitted to the computer over line 12.

The position sensor 22 may, for example, be a slidewire with a tap wherein the relationship of the tap to the slidewire is determined by the position of the shaft 20 of the drive unit motor 18. Such a position sensor will then produce on line 28 an analog signal in the form of a voltage, for example, which is continuously representative of the actual position of the drive unit. The position sensor may, of course, be any one of a number of other types of sensors as may be desired for the type of service involved.

The digital value on bus or lines 14 which are supplied as inputs to the drive unit error register 30 are added to any stored value in that register so that the stored value corresponds to the change in position called for by the last signals provided over lines 14 plus any remaining magnitude stored in that register from the previous change signals. Thus, the register provides on its output lines 32 a digital signal representing the total change in drive unit position which has been required by the computer 10 but which has not yet been effected by a change in position of the drive unit 18.

Whenever the digital signals provided on lines 32 supply the pulse modulating logic 34 an input which is other than zero, it is desirable to produce a signal which will cause the drive unit to move in an appropriate direction. There is therefore provided by modulating logic 34 an output on either line 36 or line 38 to the output logic 40 indicating respectively either an increase or decrease requirement in the opening of the valve 24 and hence either a clockwise or counter-clockwise rotation, for example, of drive unit 18. The signals which appear on either line 36 or 38 depend upon the polarity or sense of the change in drive unit position required, and are processed in the output logic of block 40 to produce either on line 42 or line 44 signals to the power switch 48 which will be effective respectively to provide an output either on line 50 or 52 to energize the drive unit motor 18 for rotation in one direction or the other. For example, a signal on line 42 may cause the power switch to provide a pulse on line 50 into drive unit 18 which will produce clockwise rotation of the shaft 20 of the drive unit 18 whereas a comparable signal on line 44 instead of line 42 will be effective by way of the power switch 48 to provide a pulse of similar magnitude on line 52 to produce an equal counterclockwise rotation of the drive unit.

The pulse modulating logic which accepts the digital signal from line 32 and produces outputs on lines 36 or 38 depending upon the direction of position change required, may be made up of any of a number of circuits. For example, there may be utilized a ramp generator for generating a ramp signal over the duty cycle period established for the drive unit. The magnitude of that ramp signal may be compared with the magnitude of the drive unit error obtained from the lines 32 as, for example, by a digital comparator. A pulse may be started at the beginning of the ramp and terminated when the ramped signal equals the error signal so that the duration of the pulse produced in each duty cycle is proportional to the magnitude of the error signal from lines 32. Thus, there will be produced either on line 36 or line 38 for each duty cycle of the drive unit a pulse of duration corresponding to the magnitude of the change in position represented by the stored value in register 30. That pulse is effective in the output logic to provide a similar pulse on a corresponding output line 42 or 44 for operation of the power switch 48. The output logic also may, for example, include limit circuits or manual control logic which may be desired.

The signals on lines 42 and 44, as previously mentioned, initiate the application of the necessary power to either line 50 or 52. For this purpose the power switch 48 may, for example, be a solid state switching array which is controlled by the signals on lines 42 and 44.

In order to update the drive unit error register 30 as well as the position register 60, it is desirable to produce pulses on lines 62 and 64 such that each pulse represents an increment of position change for the drive unit 18, with that increment corresponding to the least significant digit in the register 30.

To produce the updating pulses provided on lines 62 and 64, the analog signal which appears on line 28 representing the actual position of the drive unit 18 is compared in comparator 68 to the signal which is produced on line 70 by the digital to analog converter 72 in accordance with the value stored in the position register 60 and read out of that position register over line 74 as an input to the converter. When the signal on line 28 differs from the signal on line 70, the comparator 68 produces a signal on its output line 78 to the gating logic 80 which is effective to gate the output of the clock source 82 through the gating logic 80 to the lines 62 and 64 so that, by virtue of the clock signal gated to line 62, there is a resulting decrementing to the register 30 and by virtue of the clock signal gated on line 64, there is either an incrementing or decrementing of the contents of the position register 60 depending on the direction of the position change of the drive unit. When the signal on line 70 representing the position measurement is equal to the signal on line 28 representing actual drive unit position, there is neither incrementing or decrementing of the register 30. Thus the number of incremental pulses on lines 62 and 64 represent the actual change in drive unit position.

Therefore, any change in position of the drive unit 18 as a result of operation of the power switch 48 which is effective to produce a difference between the position sensed by position sensor 22 and the position stored in the position register 60 is effective to step the register 30 so as to decrement the value stored in that register while it increments or decrements and therefore updates the value stored in the position register 60 so as to cause that value to correspond with the position sensed by position sensor 22. The position register 60 may therefore provide over lines 16 to the digital process controller 10 signals indicative of the existing position of drive unit 18 with the signal provided being in digital form as used by the digital computer. However these signals on line 16 are not a requirement for establishing the drive unit position change in accordance with that called for by the computer.

It will be evident from the above description that over the number of duty cycles of the drive unit 17 which occur for each of the periodic outputs from the computer over line 14, there is produced a pulse input to the drive unit 18 for energizing it in an appropriate direction with the magnitude of each pulse corresponding to the magnitude stored in register 30. As the drive unit 18 changes its position, causing a corresponding decrementing of the register contents in register 30, the duration of the pulses diminishes in view of the lower value of the contents of register 30 until the drive unit 18 has assumed the desired position, namely when the contents of register 30 are zero. This results in an actual drive unit position change, as represented by the number of decrements of register 30, exactly equaling the required position change which had initially been placed in register 30 from the computer on the bus or lines 14.

What is claimed is:

1. Apparatus for controlling the position of an electric drive unit in response to periodically produced digital control signals indicative of the position change required for the drive unit during the period, comprising:

a first register for receiving said digital control signal and changing the magnitude of its stored value accordingly;

means for supplying power to said drive unit in an amount proportional to said stored value so as to move said drive unit in a direction and by an amount corresponding respectively to the sign and magnitude of said stored value;

a second register for storing a value indicative of the position of said drive unit;

a digital to analog converter for producing from the contents of said second register an analog signal representing the existing position of said drive unit;

means for producing an analog signal representing the actual position of said drive unit;

a clock source;

gating means operable to gate clock signals from said clock source to said first and second registers to step said first and second registers as necessary to update their contents;

a comparator for comparing said analog signal from said converter with said actual position signal, said comparator being connected with said gate means to cause said gate means to step said registers until said converter signal and said actual position signal are equal.

2. Apparatus as set forth in claim 1 in which said means for supplying power to the drive unit includes:

means for producing during each duty cycle time period a pulse of duration proportional to the magnitude of the signal stored in said first register.

3. Apparatus for controlling the position of an electric drive unit in response to periodically produced digital control signals indicative of the position change required for the drive unit during the period, comprising:

a first register for receiving said digital control signal and changing the magnitude of its stored value accordingly;

means for supplying power to said drive unit in an amount proportional to said stored value so as to move said drive unit in a direction and by an amount corresponding respectively to the sign and magnitude of said stored value;

a second register for storing a value indicative of the position of said drive unit;

means responsive to a deviation of the actual drive unit position from that represented by the value stored in said second register for stepping said first and second registers so as to update them whereby the second register provides a digital signal representing the actual position of the drive unit and the first register provides digital signals representing the remaining change in position required.

4. Apparatus for controlling the position of an electric drive unit in response to periodically produced digital control signals indicative of the required position change for the drive unit during the period, comprising:

a first register for receiving said digital control signal and changing the magnitude of its stored value accordingly;

means responsive to the position of said drive unit for producing a first analog signal continuously representing the actual position of the drive unit;

a second register for storing a value indicative of the position of said drive unit;

a digital to analog converter for producing from the contents of said second register a second analog signal corresponding to the stored value;

a comparator for comparing said first and second analog signals;

a source of clock pulses;

a gating means operable in response to said comparator to gate clock pulses to said first and second register, so as to alter the contents of said second register to bring the value stored therein into correspondence with the value of the first analog signal and to alter the value in said first register to maintain that value in correspondence with the remaining required position change for the said drive unit in the period; and means for supplying power to said drive unit in an amount related to the value in said first register so as to move said drive unit in the direction corresponding to the sign of said value in said first register until the said value in said first register reaches zero, indicating that the change in the actual position of said drive unit has equalled said required position change.

5. Apparatus for controlling the position of an electric drive unit in response to periodically produced digital control signals indicative of the required position change for the drive unit during the period, comprising:

a first register for receiving said digital control signal and changing the magnitude of its stored value accordingly;

means for producing an analog signal representing the actual position of the drive unit;

a second register for storing a value indicative of the position measurement of said drive unit;

a digital to analog converter for producing from the contents of said second register an analog signal representing the position measurement of said drive unit;

a comparator for comparing said analog signal representing the position measurement with said analog signal representing the actual position of said drive unit;

a clock source to produce clock pulses;

a gating means connected to said comparator to provide gated clock pulses operative to change the value stored in said first and second registers, in accordance with the sign of the unbalance of said comparator until the said analog signal representing the position measurement and the said analog signal representing actual position are equal, with the number of said gated clock pulses representative of the actual position change of said drive unit; and means for supplying power to said drive unit in an amount related to the value in said first register so as to move said drive unit in the direction corresponding to the sign of said value in said first register until the said value in said first register reaches zero, indicative that the said actual position changes of said drive unit have equalled said required position changes.

6. Apparatus as set forth in claim 5 in which the amount of power supplied to the drive unit is related to the value in said first register in direct proportionality.

* * * * *